(12) United States Patent
Mohammed et al.

(10) Patent No.: US 7,805,616 B1
(45) Date of Patent: Sep. 28, 2010

(54) GENERATING AND INTERPRETING SECURE AND SYSTEM DEPENDENT SOFTWARE LICENSE KEYS

(75) Inventors: Samiullah Mohammed, Sunnyvale, CA (US); Aseem Vaid, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 840 days.

(21) Appl. No.: 11/694,169

(22) Filed: Mar. 30, 2007

(51) Int. Cl.
*H04L 9/32* (2006.01)
(52) U.S. Cl. .......................... 713/189; 726/26; 726/27
(58) Field of Classification Search ......... 380/200–203, 380/241, 46; 713/176, 181, 189, 168; 726/26–31; 705/58–59
See application file for complete search history.

(56) References Cited

U.S. PATENT DOCUMENTS 5,758,068 A * 5/1998 Brandt et al. ................. 726/27
6,189,146 B1 * 2/2001 Misra et al. .................. 717/177
2002/0116339 A1 * 8/2002 Lin .............................. 705/59

* cited by examiner

Primary Examiner—Hosuk Song
(74) Attorney, Agent, or Firm—Cesari and McKenna, LLP

(57) ABSTRACT

A technique is provided for generating and interpreting secure and system dependent software license keys. According to one or more embodiments of the present invention, a device executing an encoding algorithm may generate a software license key by applying several layers of security. Illustratively, the device may initially define a license data representing a software license for the software. The device may also compute an authentication code based on a unique identification of hardware upon which the software is configured to operate. The license data and authentication code may be combined and encrypted into an encrypted result, which may be transformed into a software license key (e.g., human readable). Also, the device may apply a predetermined encryption technique (e.g., cipher) during the transformation as an additional layer of security. Conversely, a device configured to operate the software may execute a decoding algorithm to interpret the software license key similarly in reverse.

24 Claims, 5 Drawing Sheets

GENERATING AND INTERPRETING SECURE AND SYSTEM DEPENDENT SOFTWARE LICENSE KEYS

FIELD OF THE INVENTION

The present invention relates generally to computer software, and, more specifically, to generating and interpreting software license keys.

BACKGROUND OF THE INVENTION

Manufacturers (e.g., licensors) often license use of software and hardware products to users (e.g., licensees). Typically, a licensor issues a software license key in the form of a text string that a licensee can enter into the product to unlock or otherwise enable certain features of the product. For example, a manufacturer may configure a hardware system (e.g., a storage server) and associated software product (both created by the manufacturer or in conjunction with one or more manufacturing partners, etc.), and provide/deliver the combined product to a user. The user of the combined hardware and software product may unlock the product using a supplied software license key (e.g., that is human readable), for example, included within packaging of the product or as a separate communication (e.g., phone, email, etc.). That is, the software product interprets the software license key to determine whether the user is a valid licensee, and to determine which particular features of the product to unlock.

Notably, where a manufacturer packages hardware and software together, it is generally desirable that the software is not used on other hardware (e.g., not of the manufacturer), and particularly desirable that the software is not copied and used on multiple hardware systems. Where the distribution of the packaged product is limited (e.g., to limited numbers of users, such as enterprises), a high level of trust and maintained communication ("high-touch" support) may allow for a liberal licensing scheme. For example, because the licenses may be easily tracked in such limited numbers, a same string may be used for the license key to enable any instance of the software on any hardware system. Alternatively, different strings may be used (e.g., to unlock various features or to give the appearance of security), but such strings need not be particularly secure due to a low probability of fraudulent use.

Certain hardware and software, however, may have wider distribution, and/or a correspondingly lower level of trust, particularly for low-touch support models (e.g., where there is little to no interaction with the licensee). For instance, volume distribution of the product (e.g., global distribution) makes it increasingly burdensome to maintain sufficient control over software licenses. As such, fraudulent users may enter copied license keys into their software (which may also be copied). Alternatively, if the encryption used to generate the software license key is weak, fraudulent users may break the encryption and generate a key that may be entered into the software to unlock the product. In particular, the fraudulent keys may be used to enable the software product on hardware not originally intended by the manufacturer.

There remains a need, therefore, for software license keys that reduce the likelihood of proliferation and misuse of software licenses, particularly across different hardware systems. Further, there remains a need for such software license keys to be distributed over insecure channels, such as from third party sales, support, and manufacturing partners, for instance, in a form that is readable by the user/licensee.

SUMMARY OF THE INVENTION

The present invention overcomes the disadvantages of the prior art by providing techniques for generating and interpreting secure and system dependent software license keys. According to one or more embodiments of the present invention, a device executing an encoding algorithm may generate a software license key by applying several layers of security. Illustratively, the device may initially define license data representing a software license for the software (e.g., which would enable one or more features of the software). The device may also compute an authentication code based on a unique identification of hardware upon which the software is configured to operate (e.g., and a secret key contained within the software). The license data and authentication code may be combined and encrypted into an encrypted result (e.g., and encrypted again for further security), which may be transformed into a software license key (e.g., a human readable key). Also, in one or more embodiments, the device may apply a predetermined encryption technique, e.g., a cipher, during the transformation as an additional layer of security.

Conversely, according to one or more embodiments of the present invention, a device configured to operate the software may execute a decoding algorithm to interpret the software license key, e.g., to enable the one or more features of the software. Illustratively, the device is provided with a software license key for the software (e.g., as generated above), and transforms the software license key into an encrypted result (notably, after a decipher, if so configured above). The device then decrypts the encrypted result (e.g., twice, if necessary as above) into a combined license data and authentication code. The authentication code may be authenticated against the unique identification of hardware upon which the software is configured to operate. If authenticated, the device may determine the software license (e.g., thus the features of the software to enable) as defined by the license data.

Advantageously, the novel technique generates and interprets secure and system dependent software license keys. By providing multiple layers of security as described, the novel technique produces license keys specific to the hardware upon which the software is configured to operate, and allows only that hardware to support features of the software that are enabled by the key. Also, in one or more embodiments of the invention, the license keys are not only secure and system dependent, but are also human readable, and substantially different with even just a single bit change in the hardware identification and/or software license data. In particular, the software license keys used herein may reduce the likelihood of proliferation and misuse of software licenses across hardware systems.

BRIEF DESCRIPTION OF THE DRAWINGS

The above and further advantages of the invention may be better understood by referring to the following description in conjunction with the accompanying drawings in which like reference numerals indicate identical or functionally similar elements, of which.

DETAILED DESCRIPTION OF AN ILLUSTRATIVE EMBODIMENT

A. Encoding and Decoding Device Architectures

Figure 1:
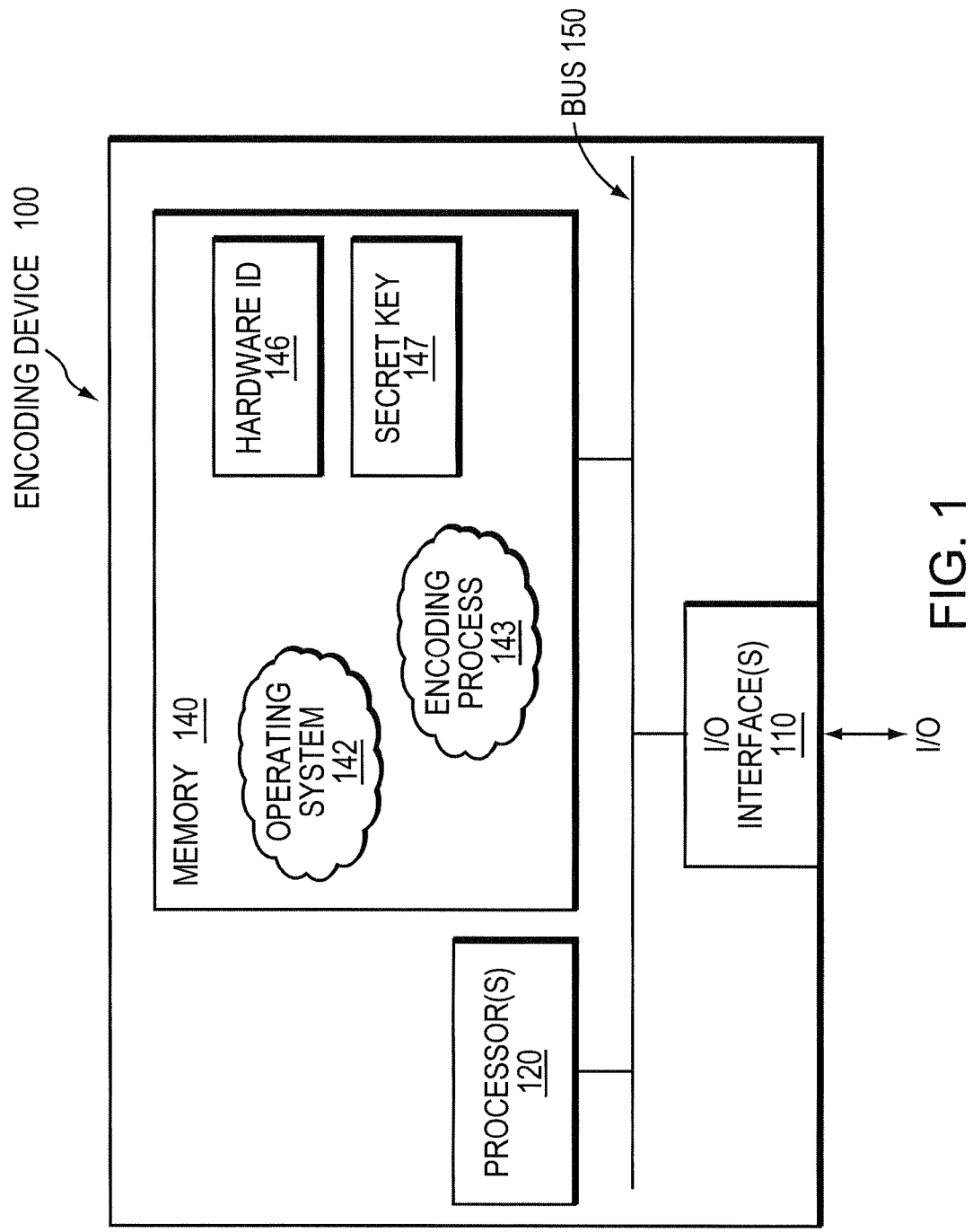
FIG. 1 is a schematic block diagram of an example encoding device that may be advantageously used with one or more embodiments described herein.

The present invention provides techniques for generating (encoding) and interpreting (decoding) secure and system dependent software license keys. FIG. 1 is a schematic block diagram of an example device 100 that may be advantageously used with one or more embodiments described herein, e.g., as an encoding device. The device comprises one or more input/output (I/O) interfaces 110, one or more processors 120, and a memory 140 interconnected by a system bus 150. The I/O interfaces 110 contain the mechanical, electrical, and signaling circuitry for communicating data over physical links, such as for user/administrator interfacing (e.g., keyboards, mice, monitors, etc.) and other I/O devices (internal/external data storage, disk drives, etc.), as well as for network interfaces, as will be understood by those skilled in the art.

The memory 140 comprises a plurality of storage locations that are addressable by the processor(s) 120 and the I/O interfaces 110 for storing software programs and data structures associated with the embodiments described herein. The processor(s) 120 may comprise necessary elements or logic adapted to execute the software programs and manipulate the data structures, such as storage locations for hardware identifications (IDs) 146 and secret key(s) 147, etc. An operating system 142, portions of which are typically to resident in memory 140 and executed by the processor(s), functionally organizes the device by, inter alia, invoking operations in support of software processes and/or services executing on the device. These software processes and/or services may comprise, in particular, an encoding process 143 to be used by a licensor (or a licensor's partner) as described herein. (Notably, while encoding process 143 is shown separately from operating is system 142 in FIG. 1, the encoding process may be a process/thread operating as part of the operating system 142, and the view shown herein is merely a representative example and is not meant to be limiting to the present invention.) It will be apparent to those skilled in the art that other processor and memory means, including various computer-readable media, may be used to store and execute program instructions pertaining to the inventive techniques described herein.

Figure 2:
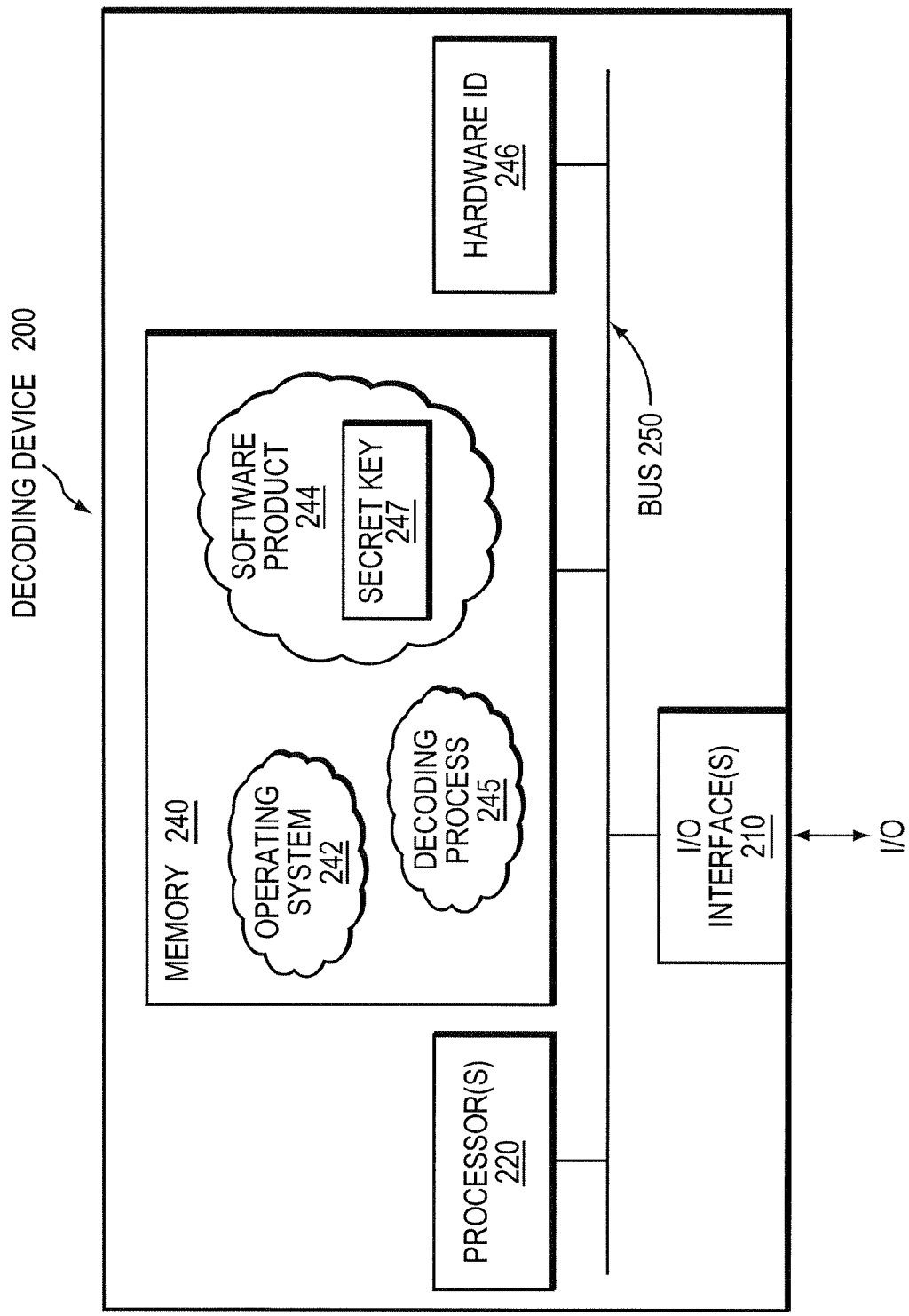
FIG. 2 is a schematic block diagram of an example decoding device that may be advantageously used with one or more embodiments described herein.

In addition, FIG. 2 is a schematic block diagram of an example device 200 that may be advantageously used with one or more embodiments described herein, e.g., as decoding device. The device comprises one or more I/O interfaces 210, one or more processors 220, and a memory 240 interconnected by a system bus 250. Also, a hardware ID 246 may be located somewhere within the device 200 (e.g., a serial number of a motherboard, etc.). The memory 240 comprises a plurality of storage locations that are addressable by the processor(s) 220 and the I/O interfaces 210 for storing software programs and data structures associated with the embodiments described herein. The processor(s) 220 may comprise necessary elements or logic adapted to execute the software programs and manipulate the data structures. An operating system 242, portions of which are typically resident in memory 240 and executed by the processor(s), functionally organizes the device by, inter alia, invoking operations in support of software processes and/or services executing on the device. These software processes and/or services may comprise, in particular, a decoding process 245 to be used by a licensee as described herein, as well as the software product 244 for which the software license key is intended. (Notably, while decoding process 245 is shown separately from operating system 242 in FIG. 2, the encoding process may be a process/thread operating as part of the operating system 242, and the view shown herein is merely a representative example and is not meant to be limiting to the present invention.) It will be apparent to those skilled in the to art that other processor and memory means, including various computer-readable media, may be used to store and execute program instructions pertaining to the inventive techniques described herein.

Illustratively, an example decoding device 200 that may be used in accordance with the present invention is the StoreVault™ model s500, available from Network Appliance, Inc., of Sunnyvale, Calif., for example, utilizing the ONTAP® operating system 242, also available from Network Appliance, Inc. As such, an illustrative encoding device 100 that may be used may be a device configured to generate software license keys for the StoreVault™ model s500, accordingly. (For example, the encoding device 100 may be managed by Network Appliance, Inc., or by other authorized third-party license generators, as will be appreciated by those skilled in the art.)

B. Generating (Encoding) Secure and System Dependent Software License Keys

According to one or more embodiments of the present invention, a device 100 executing an encoding algorithm (encoding process 143) may generate a software license key by applying several layers of security, e.g., under operation of the licensor. In particular, encoding process 143 contains computer executable instructions executed by each processor 120 to perform functions relating to the encoding (generation) of software license keys as described herein. Notably, the software license key may also be generated/encoded by the manufacturer/licensor, or by any trusted licensing partner with access to the encoding process 143 (e.g., third party licensors).

Figure 3:
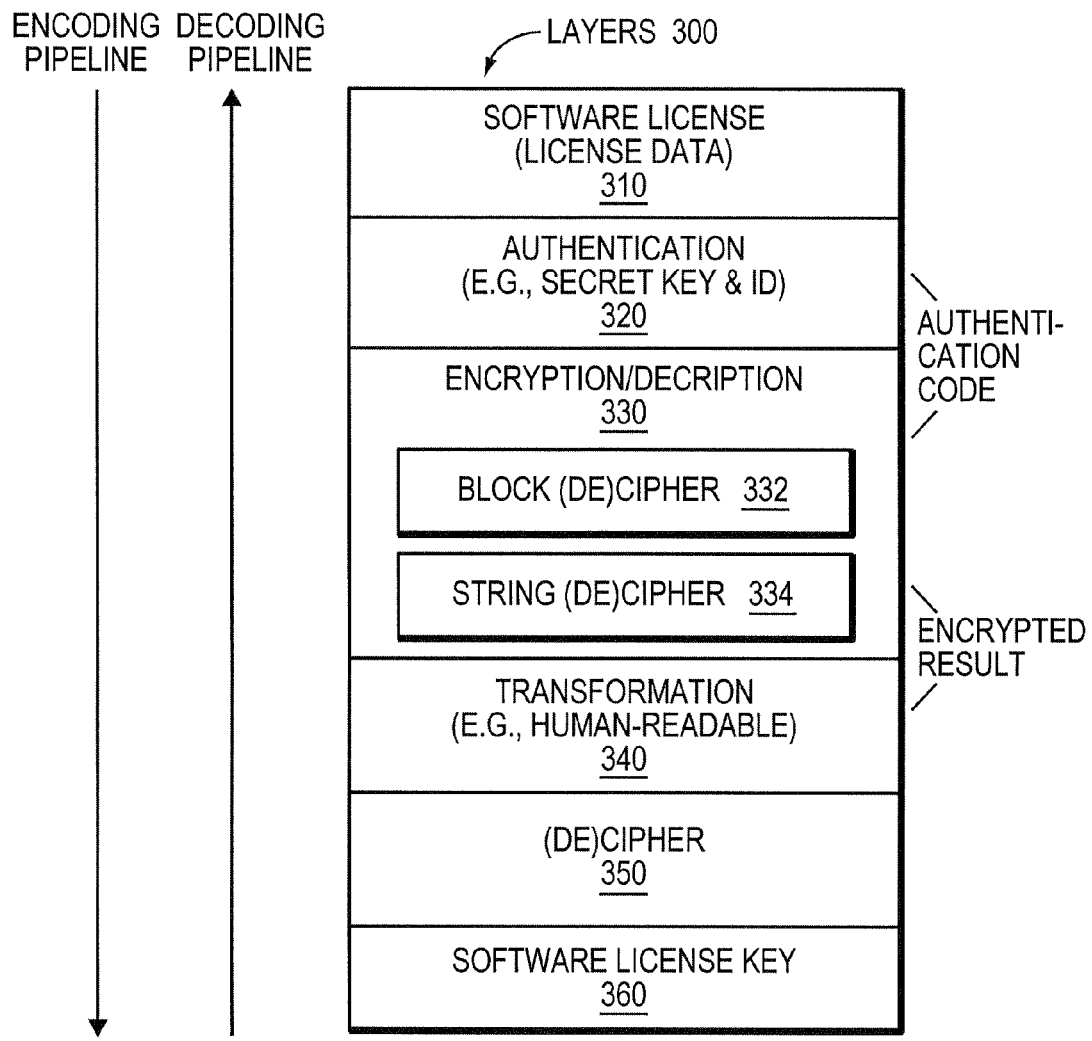
FIG. 3 is a schematic block diagram of example layers of security in accordance with one or more embodiments of the present invention.

Illustratively, FIG. 3 is a schematic block diagram of layers 300 of security in accordance with one or more embodiments of the present invention. For instance, multiple layers (or "rings") of security add enhanced security and strength to the keys, such that in the event of one of the layers becoming exposed (compromised), the other layers may still operate to secure the license from a fraudulent licensee. The layers 300 cooperate to provide a desired result, i.e., the software license key (360) (e.g., a human-readable string), based on the software license (310) and authentication material (320). Of particular interest to the licensor, the resultant software license key should not have repeatable portions in the string, such that even a small change to the license or authentication material produces a totally unique key (string).

Accordingly, an "encoding layers pipeline" may begin traversing the layers 300 with the intended software license (layer 310), e.g., which would enable one or more features of the software. For example, the licensor may define license data that includes a representation of the software license, such as an encrypted bitmap or other structured data, which decoding processes 245 (described below) may interpret to determine the one or more features of the software to enable. Illustratively, in addition to defining a license for a single feature of the software product, the licensor may create arbitrary "bundles" of features by defining different license data. In this manner, features (e.g., particular protocols) ordered by a user/licensee may be grouped together into a single software license key, as opposed to requiring multiple keys, each of which unlock a single feature.

In addition to simply representing the software license, other information may be contained within the defined license data. For instance, a particular version of the software may be represented, such as where one or more features of the software may have multiple available versions. As such, the different versions (of the same features) may have different corresponding license data (and thus license keys). Also, "freeform" data may be included within the license data that does not necessarily represent the software license. For example, additional freeform information (e.g., substantially random or pseudo-random values) may augment the software license within the license data, such as to change statistical properties (e.g., appearance) of the key to be generated or to allow for different keys to be generated for the same software license. Further, units/services of the software product may be developed (e.g., after the initial release of the software product) that require use of the freeform data. Those new features, then, may be conveyed within a new software license key that makes use of the freeform data, such as for new features, function/command names to operate, etc. Illustratively, incorporating predesignated space for freeform data may allow for future (e.g., unforeseen) uses of the license data structure without requiring a reconfiguration/recompiling of the OS 242 or dew coding process 245 of the decoding device in order to interpret the new information, as may be appreciated by those skilled in the art. In other words, license data may comprise the software license, as well as optional version fields and/or other freeform data as mentioned above.

In accordance with one or more embodiments of the present invention, the encoding device 100 may also compute an authentication code based on a unique identification of hardware upon which the software is configured to operate. For instance, according to one or more embodiments of the present invention, the manufacturer/licensor (or partner) may be previously aware of the hardware upon which the software is configured to operate. In this manner, the licensor may be aware of a hardware ID (stored in memory of the encoding device as hardware ID 146) of the decoding devices 200 (e.g., a serial number of a motherboard, etc.), and may "bind" the hardware to the software license so a different and specific license is granted to each hardware device using the software. (Alternatively or in addition, the "hardware ID" may imply a particular platform, such as a particular type of operating system 242 of decoding devices, particular types of processors 220, or other uniquely identified groups of configured devices). Illustratively, the hardware ID may be combined with a secret key 147 (for example, hashed, etc.) to produce the authentication code. The secret key 147 is privately known to the licensor, and, as described below, may be contained (e.g., preferably hidden) within the software product 244 (as secret key 247). Note that because hashes may not produce a large difference in output for small changes in input (as may be understood by those skilled in the art), the additional layers may be used to protect (hide) the secure information.

For instance, for the next layer of security (layer 330), the license data and authentication code may be combined (e.g., concatenated) and encrypted into an encrypted result. Various encryption techniques/algorithms will be understood by those skilled in the art, which, for example, are trusted methods of securely encrypting data. For example, a string cipher, a block cipher, and other encoding/encrypting techniques are known encryption algorithms in the art that may be used in layer 330. Illustratively, multiple encryptions may be used in the encryption layer 330, e.g., using a first encryption technique (e.g., a block cipher) in sub-layer 332 on the combined license data and authentication code, then using a second encryption technique (e.g., a string cipher) in sub-layer 334 on the result of the first encryption technique. Notably, any combination of encryption algorithms may be used (if appropriate), such that whichever known algorithm is used first, a different algorithm is used second, and so on. Those skilled in the art will appreciate that the multiple encryptions (e.g., double-encryption) enhances the security of the software license.

According to the next layer (340), the encoding process 143 transforms the result of the encryption layer 330 (the encryption result) into a software license key. Illustratively, the transformation may be used to transform the encryption result (generally a substantially long and cryptic string) into a more manageable, e.g., human readable, software license key. For example, the software license key may be presented in a manageable manner in a string of characters made up of letters (e.g., upper and/or lower case) and/or numbers, as opposed to a large sequence of bits or other non-human-readable (i.e., not particularly human-readable) characters. Also, in one or more embodiments, the encoding process 143 of the encoding device 100 may apply another encryption technique/algorithm (layer 350) to the transformed key, such as a conventional cipher as an additional layer of security. For instance, the initial transformation may produce a transformed (e.g., human-readable) code, which is then encoded by another layer (350) into the final key. The final layer (360) is the resultant software license key that is both secure and system dependent. (For example, a key in a conventional and manageable "5×5" human-readable format, that is, "XXXXX-XXXXX-XXXXX-XXXXX-XXXXX", where each X represents either letter or number.)

Those skilled in the art will appreciate that each layer 300 may utilize conventional techniques/algorithms, but that the particular pipeline (order of the layers) is novel and useful to provide the desired result (a secure and system dependent software license key). In particular, the use of conventional (i.e., known) encryption/transformation techniques within each layer may be beneficial because they may be more trusted and or proven to be (substantially) secure. Examples of encryption, decryption, and transformation techniques that may be used at each layer may comprise: string ciphers, block ciphers, symmetrical encryption, asymmetrical encryption, human-readable transformations, hashing algorithms, etc. More specifically, examples of conventional techniques that may be known and understood by those skilled in the art may comprise: "AES" (Advanced Encryption Standard), "RSA" (Rivest, Shamir, Adleman), "RC4" (Rivest Cipher 4), "RC2", "DES" (Data Encryption Standard), "triple-DES" (triple DES), "DESX" (an is enhanced DES), "SHA1" (Secure Hash Algorithm 1), "MD5" (Message-Digest algorithm 5), Caesar Cipher, Base-26 transformations, Base-32 transformations, Base-64 transformations, etc.

Notably, it may also be beneficial to particularly select encryption/transformation techniques that are suitable for the length of the software license and the associated license keys, and each stage of the pipeline, accordingly. For example, a first technique may require input data length to be in multiples of blocks if block ciphers are used. As such, a second technique whose output produces the input of the first technique may be required to generate an appropriate output (e.g., a length in multiples of blocks, etc.). Further, selection of techniques utilized in the pipeline may be particularly based on an order which produces substantially different key patterns (e.g., particularly to a human user's perception) based on small or large changes to the input (e.g., the license data/authentication code, etc.).

Figure 4:
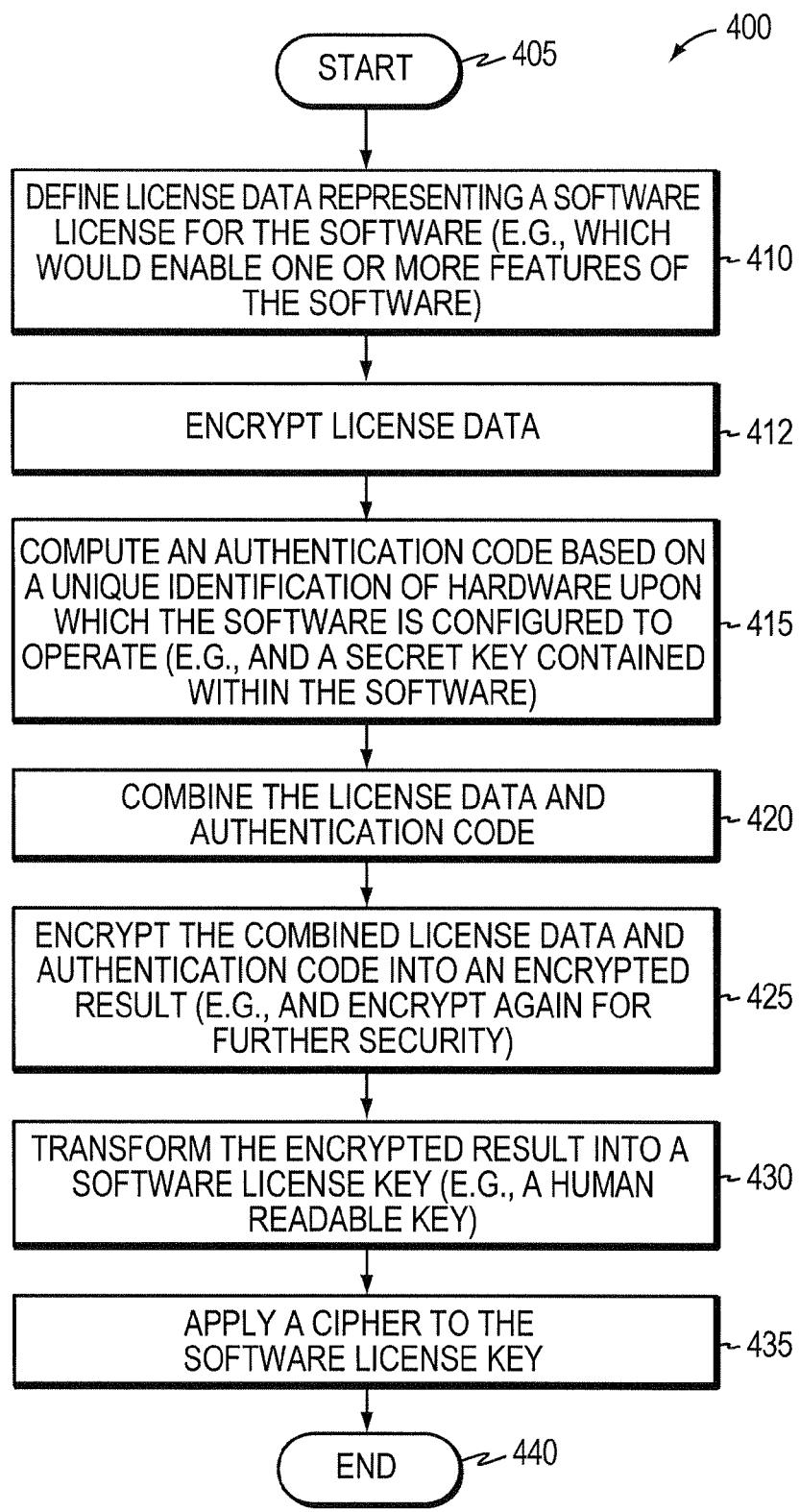
FIG. 4 is a flowchart of a procedure for generating (encoding) secure and system dependent software license keys in accordance with an illustrative embodiment of the present invention.

FIG. 4 is a flowchart detailing the steps of a procedure 400 for generating (encoding) secure and system dependent software license keys in accordance with an illustrative embodiment of the present invention. The procedure 400 begins in step 405 and continues to step 410 where license data is defined for the encoding process 143 representing a software license for the software product 244 (e.g., which would enable one or more features of the product), which may be encrypted in step 412. For example, as mentioned above, a system administrator or a dynamic algorithm may generate the license data in a manner that represents to an interpreting device (described below) the one or more features of the software product to enable (e.g., along with any versions, freeform data, or random numbers, as mentioned above). Also, in step 415, the encoding process of the encoding device computes an authentication code based on a unique identification of hardware (hardware ID 146) upon which the software is configured to operate (e.g., and a secret key 147 contained within the software). That is, as mentioned above, the hardware ID and secret key may be combined, e.g., hashed, to produce the authentication code.

The encoding process combines the license data (e.g., encrypted) and authentication code in step 420, and encrypts the combined license data and authentication code into an encrypted result in step 425. For instance, as described above, the encryption (layer 330) may comprise a single encryption, or an addition encryption for further security, such as a block cipher and a string cipher (both illustratively in step 425). The encrypted result (e.g., the double-encrypted result) may then be transformed in step 430 into a software license key, such as into a human readable key. Notably, in step 435, the encoding process may apply a cipher to the software license key for an added layer (layer 350) of security. The generating/encoding process 400 ends in step 440 with a secure and system dependent software license key (360).

C. Interpreting (Decoding) Secure and System Dependent Software License Keys

According to one or more embodiments of the present invention, a device 200 configured to operate the software may execute a decoding algorithm (decoding process 245) to interpret the software license key 360, e.g., to enable the one or more features of the software product 244 for a licensee. In particular, decoding process 245 contains computer executable instructions executed by each processor 220 to perform functions relating to the decoding (interpretation) of software license keys as described herein. Note that the decoding process 245, although shown separately, may be an integrated component of the software product 244, as will be understood by those skilled in the art.

Referring again to FIG. 3, the layers 300 of security in accordance with one or more embodiments of the present invention are again traversed, but in a reverse direction to the encoding pipeline as described above (e.g., according to a "decoding layers pipeline"). In particular, as will be appreciated by those skilled in the art, the licensor may decide which techniques/algorithms are to be used by the encoding process 143 for each layer 300 of the pipeline (e.g., string/block ciphers/transformations, etc.). Accordingly, the decoding process 245 of the licensee is configured to utilize the same techniques/algorithms in reverse. That is, as described below, the decoding process may be properly configured to utilize appropriate decryption/deciphering algorithms to decrypt/decipher encrypted/ciphered results using encryption/ciphering algorithms as utilized by the encoding process 143 above. For example, if a block cipher/encryption is used at a particular layer, that layer in reverse is configured to use a block decipher/decryption.

Illustratively, in accordance with interpretation of the key, the decoding process 245 of the device 200 containing the software product 244 is provided with a software license key (360) for the software (e.g., as generated above). For example, as will be appreciated by those skilled in the art, a software product user may obtain a copy of the software product 244, e.g., packaged with the device hardware or installed at a later time. The software license key may have been shipped to the user along with the product, or may have been provided to the user separately, such as by paper, email, telephone, web transmission, etc. The software user (e.g., the licensee) may then input the key into the device 200, such as though I/O interfaces 210 (e.g., a conventional graphical user interface, or GUI). (In one or more embodiments where a human readable key is not necessary, the key may also be downloaded and stored in memory 240 without being seen by the user.)

The decoding process 245 may then transform the provided software license key into an encrypted result (layer 340) utilizing whichever transformation technique that was originally utilized by the encoding process 143 above in reverse. That is, the transformation in reverse may transform a human-readable key into the encrypted result (which may not necessarily be readily human-readable). Notably, if so configured above, the decoding process 245 may first apply a decipher in layer 350 prior to transforming the key into an encrypted result. The decoding device also decrypts the encrypted result (layer 330) into a combined license data and authentication code. If the encoding technique described above is configured to double-encrypt at layer 330, the device may decrypt a double-encrypted result using two decryption techniques, e.g., a string decipher in sub-layer 334 and a block decipher in sub-layer 332, notably in the reverse order of the encryption used by the encoding process 143 above.

Once the authentication code is obtained (e.g., separated from the license data), the decoding process may authenticate the authentication code (layer 320) against the unique identification of hardware upon which the software is configured to operate, e.g., the hardware ID 246 of the device. For instance, the decoding process may be configured to locate the secret key 247 of the software product 244, and may apply it to the authentication code. The result of this application may then be compared with the hardware ID 246 of the device to determine a match. (Note that it may be beneficial under certain specific situations as determined by the licensor to store the hardware ID in memory 240 in order to exchange hardware without requiring a new license key.)

If the authentication code is authenticated (e.g., if it matches the hardware ID of the device), the decoding process of the device may determine the intended software license as defined by the corresponding license data (layer 310). In other words, the decoding process utilizes the license data to enable (unlock/release) features of the software product 244, for example, by decrypting the license data to determine which particular protocols have been ordered by the user. The user (a verified licensee) may thus begin utilizing the software product accordingly. Also, as noted above, if the software product 244 contains a plurality of features, and if the software license key unlocks a subset of those features, the user may simply order new features from the licensor to obtain a new license key that will unlock those new features without requiring further software installation. Moreover, because the original key and the new key are substantially different in appearance (i.e., generally have substantially no recognizable patterns or repeated characters based on the newly unlocked features), the user (licensee) will detect no patterns to attempt to fraudulently unlock features that were not properly licensed. Further, if new features are developed that make use of the freeform data, such new features may be obtained with a new license key without requiring reconfiguration/recompiling of the OS 242 or decoding process 245, as mentioned above.

Figure 5:
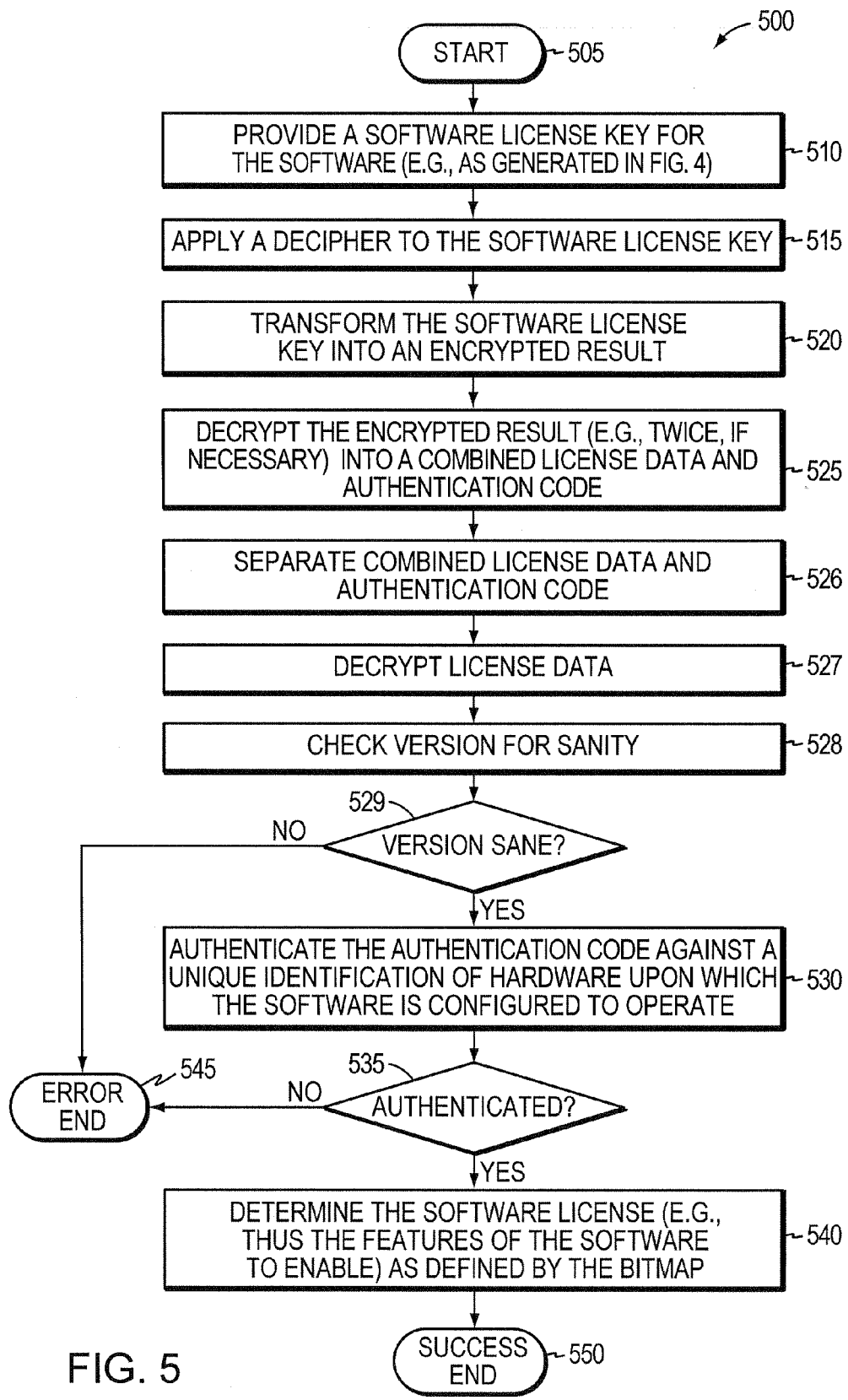
FIG. 5 is a flowchart of a procedure for interpreting (decoding) secure and system dependent software license keys in accordance with an illustrative embodiment of the present invention.

FIG. 5 is a flowchart detailing the steps of a procedure 500 for interpreting (decoding) secure and system dependent software license keys in accordance with an illustrative embodiment of the present invention. The procedure 500 begins in step 505 and continues to step 510 where the decoding process 245 is provided with a software license key (360) for the software product 244 (e.g., as generated in FIG. 4). If necessary (that is, if performed in FIG. 4), the decoding process may apply a decipher to the software license key in step 515. The software license key is then transformed into an encrypted result in step 520 by the decoding process, which then decrypts the encrypted result in step 525 into a combined license data and authentication code. Again, as mentioned above, the decryption (layer 330) may require a single decryption, or an additional decryption for further security, such as a block decipher and a string decipher (both illustratively in step 525).

Once the combined license data and authentication code are separated in step 526, the license data may be decrypted in step 527, and a version (mentioned above) may be checked for sanity in step 528 (i.e., to determine whether the version is possible, e.g., "2.01", etc., as opposed to "A43%&", as may be appreciated by those skilled in the art). If the version is not sane in step 529 (e.g., not expected based on possible version configurations/representations of the software), the procedure 500 ends in step 545. Otherwise, if the version is sane in step 529, the decoding process 245 may authenticate the authentication code in step 530 against a unique identification of hardware upon which the software is configured to operate (e.g., hardware ID 246 of the decoding device 200, such as a motherboard serial number, etc.). Notably, as described above, the decoding process may be configured to apply a secret key 247 found within the software product 244 to the authentication code, and to compare that result with the hardware ID. If authenticated in step 535, that is, if the authentication code (e.g., as applied to the secret key) matches the unique identification, the decoding process determines the software license (e.g., thus the features of the software to enable) as defined by the license data in step 540 as described above, and the procedure 500 ends in step 550. In the event the authentication code is not authenticated in step 535, the procedure ends in step 545, e.g., with possible error reporting, etc.

Advantageously, the novel technique generates and interprets secure and system dependent software license keys. By providing multiple layers of security as described, the novel technique produces license keys specific to the hardware upon which the software is configured to operate, and allows only that hardware to support features of the software that are enabled by the key. Also, in one or more embodiments of the invention, the license keys are not only secure and system dependent, but are also human readable, and substantially different with even just a single bit change in the hardware identification and/or software license data.

In particular, the software license keys used herein may reduce the likelihood of proliferation and misuse of software licenses across hardware systems. In this manner, the present invention may be used to advantageously distribute software and keys over insecure channels with third party sales, support, and manufacturing partners. That is, the novel techniques described herein provide for hardware system (e.g., and platform) specific license management and enforcement. Specifically, by securely incorporating the specific hardware identification into the software license key, the novel techniques substantially prevent hardware other than the intended hardware from utilizing the software license key.

While there have been shown and described illustrative embodiments that generate and interpret secure and system dependent software license keys, it is to be understood that various other adaptations and modifications may be made within the spirit and scope of the present invention. For example, the embodiments have been shown and described herein utilizing illustrative algorithms at each layer 300 of the encoding/decoding pipeline (e.g., block ciphers, string ciphers, human-readable transformations, hashing, etc.). However, the embodiments of the invention in their broader sense are not so limited, and may, in fact, utilize other algorithms not specifically mentioned that are suitable for the purposes described herein, as will be understood by those skilled in the art.

Moreover, while the above embodiments describe license data that may represent features that are unlocked/enabled for a device, other uses of the license keys may be used in accordance with the present invention. For example, a software license may be defined for a license generator (encoding device 100), e.g., where the encoding device is a third party to the software developer, etc. Such a license may be encoded with no software features unlocked/enabled, in a manner that allows the software developer to limit which devices 100 may be authorized to generate license keys accordingly. In particular, the license generator (encoding device 100) may itself be required to authenticate a license prior to generating other license keys (e.g., prior to performing steps of FIG. 4) accordingly.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
defining license data representing a software license for software;
computing, by a processor executing an encoding process, an authentication code based on a unique identification of hardware upon which the software is configured to operate;
combining the license data and the authentication code;

encrypting the combined license data and authentication code utilizing a first encryption technique into an encrypted result;

encrypting the encrypted result into a double-encrypted result utilizing a second encryption technique that is not the first encryption technique; and transforming the double-encrypted result into a software license.

2. The method as in claim 1, wherein transforming further comprises:

transforming the encrypted result into a transformed code; and applying an encryption technique to the transformed code to produce the software license key.

3. The method as in claim 2, wherein the encryption technique is a cipher.

4. The method as in claim 1, wherein the software license key is human readable.

5. The method as in claim 4, wherein transforming further comprises:

establishing the software license key as a human-readable software license key.

6. The method as in claim 1, wherein encrypting further comprises:

utilizing one of either a block cipher or a string cipher.

7. The method as in claim 1, wherein computing further comprises:

applying a secret key from within the software to the unique identification of the hardware.

8. The method as in claim 7, further comprising:

hashing the secret key with the unique identification to compute the authentication code.

9. The method as in claim 1, wherein the unique identification of the hardware is a serial number of a motherboard upon which the software is configured to operate.

10. The method as in claim 1, wherein the license data comprises a representation of a version of the software.

11. The method as in claim 1, wherein the license data comprises at least one segment of freeform data not representing the software license for the software.

12. The method as in claim 1, wherein the license data comprises at least one substantially randomly generated segment.

13. A method, comprising:

providing a software license key for software;

transforming, by a processor executing an encoding process, the software license key into a double encrypted result;

decrypting the double-encrypted result into the encrypted result utilizing a first decryption technique;

decrypting the encrypted result into a combined license data and authentication code utilizes utilizing a second decryption technique that is not the first decryption technique;

authenticating the authentication code based on a unique identification of hardware upon which the software is configured to operate; and if authenticated by the processor, a software license defined by the license data.

14. The method as in claim 13, further comprising:

applying a decipher to the software license key to produce a deciphered code; and transforming the deciphered code into the encrypted result.

15. The method as in claim 13, wherein the software license key is human readable.

16. The method as in claim 15, wherein transforming further comprises:

establishing the software license key as a human-readable software license key.

17. The method as in claim 13, wherein decrypting further comprises:

utilizing one of either a string decipher or a block decipher.

18. The method as in claim 13, wherein authenticating further comprises:

applying a secret key from within the software to the authentication code to achieve an authentication result; and comparing the authentication result to the unique identification of the hardware.

19. The method as in claim 13, wherein the unique identification of the hardware is a serial number of a motherboard upon which the software is configured to operate.

20. An apparatus, comprising:

hardware upon which software is configured to operate;

means for transforming a software license key for the software a double encrypted result;

means for decrypting the double-encrypted result into the encrypted result utilizing a first decryption technique;

means for decrypting the encrypted result into a combined license data and authentication code utilizing a second decryption technique that is not the first decryption technique;

means for authenticating the authentication code based on a unique identification of the hardware; and means for determining a software license defined by the license data if the authentication code is authenticated.

21. A device, comprising:

at least one input/output (I/O) interface;

at least one processor coupled to the at least one I/O interface and configured to execute at least one process; and a memory configured to store an encoding process executable by each processor, the encoding process when executed operable to define a license data representing a software license for software; compute an authentication code based on a unique identification of hardware upon which the software is configured to operate; combine the license data and the authentication code; encrypt the combined license data and authentication code into an encrypted result utilizing a first encryption technique; encrypt the encrypted result into a double-encrypted result key utilizing a second encryption technique that is not the first encryption technique; and transform the double-encrypted result into a software license.

22. A device, comprising:

at least one input/output (I/O) interface;

at least one processor coupled to the at least one I/O interface and configured to execute at least one process; and a memory configured to store a decoding process executable by each processor, the decoding process when executed operable to: receive a software license key for software; ii) transform the software license key into a double encrypted result; decrypt the double-encrypted result into the encrypted result utilizing a first decryption technique decrypt the encrypted result into a combined license data and authentication code utilizing a second decryption technique that is not the first decryption technique; authenticate the authentication code based on a unique identification of hardware upon which the software is configured to operate; and v) determine a software license defined by the license data in response to an authenticated authentication code.

23. A computer readable medium containing executable program instructions executed by a processor, comprising:

program instructions that define license data representing a software license for software;

program instructions that compute an authentication code based on a unique identification of hardware upon which the software is configured to operate;

program instructions that combine the license data and the authentication code;

program instructions that encrypt the combined license data and authentication code utilizing a first encryption technique into an encrypted result;

program instructions that encrypt the encrypted result into a double-encrypted result utilizing a second encryption technique that is not the first encryption technique; and program instructions that transform the double-encrypted result into a software license.

24. A computer readable medium containing executable program instructions executed by a processor, comprising:

program instructions that provide a software license key for software;

program instructions that transform the software license key into a double encrypted result;

program instructions that decrypt the double-encrypted result into the encrypted result utilizing a first decryption technique;

program instructions that decrypt the encrypted result into a combined license data and authentication code utilizing a second decryption technique that is not the first decryption technique;

program instructions that authenticate the authentication code based on a unique identification of hardware upon which the software is configured to operate; and program instructions that define a software license by the license data if authenticated by the processor.

* * * * *

UNITED STATES PATENT AND TRADEMARK OFFICE
CERTIFICATE OF CORRECTION

PATENT NO.        : 7,805,616 B1
APPLICATION NO.   : 11/694169
DATED             : September 28, 2010
INVENTOR(S)       : Samiullah Mohammed et al.

It is certified that error appears in the above-identified patent and that said Letters Patent is hereby corrected as shown below:

Col. 3, Line 41, please replace "typically to resident" with "typically resident"

Col. 3, Line 49, please replace "operating is system" with "operating system"

Col. 4, Line 18, please replace "skilled in the to art" with "skilled in the art"

Col. 5, Line 36, please replace "dew coding" with "decoding"

Col. 6, Line 61, please replace "(an is enhanced DES)" with "(an enhanced DES)"

Col. 9, Line 39, please replace "2.01" with ""1", "2.01""

Col. 11, Line 52, please remove the word "utilizes"

Signed and Sealed this

Thirtieth Day of November, 2010

David J. Kappos
*Director of the United States Patent and Trademark Office*